(12) United States Patent  (10) Patent No.: US 7,878,357 B2
Yoshida et al.  (45) Date of Patent: Feb. 1, 2011

(54) CASE

(75) Inventors: Masaoki Yoshida, Shizuoka (JP);
Hiroyuki Sahara, Shizuoka (JP);
Manabu Matsumoto, Aichi (JP);
Akihiro Fuseya, Aichi (JP)

(73) Assignee: Yazaki Corporation, Tokyo (JP)

( * ) Notice: Subject to any disclaimer, the term of this patent is extended or adjusted under 35 U.S.C. 154(b) by 310 days.

(21) Appl. No.: 11/798,926

(22) Filed: May 17, 2007

(65) Prior Publication Data

US 2007/0267315 A1  Nov. 22, 2007

(30) Foreign Application Priority Data

May 17, 2006 (JP) .............................. 2006-137360

(51) Int. Cl.
*B65D 21/00* (2006.01)
(52) U.S. Cl. .................. 220/4.27; 206/509; 174/50; 174/53; 174/57; 174/58; 174/66; 174/67
(58) Field of Classification Search .............. 206/509; 220/4.27; 174/50, 53, 57, 58, 66, 67
See application file for complete search history.

(56) References Cited

U.S. PATENT DOCUMENTS 1,674,352 A * 6/1928 Adams ..................... 206/317
3,642,102 A * 2/1972 Furniss et al. .............. 190/114
5,877,450 A * 3/1999 Quin ......................... 174/66

FOREIGN PATENT DOCUMENTS

JP  2002-330529  11/2002
JP  2003-174711  6/2003

* cited by examiner

*Primary Examiner*—Anthony Stashick
*Assistant Examiner*—Elizabeth Volz
(74) *Attorney, Agent, or Firm*—Kratz, Quintos & Hanson, LLP

(57) ABSTRACT

A case is formed with a box main body and a cover. This box includes a locking member for keeping the box main body and the cover attached to each other, and a pair of temporarily locking members for absorbing a rattle generated between the box main body and the cover. The locking member is mounted on the center of a sidewall of the case. The temporarily locking members are mounted on both ends of the sidewall between which the locking member is interposed. The temporarily locking members are temporarily locked together simultaneously with an engagement of the locking member, and unlocked by bending the sidewall when the locking member is disengaged.

2 Claims, 4 Drawing Sheets

CASE

CROSS REFERENCE TO RELATED APPLICATIONS

This application is on the basis of Japanese Patent Application No. 2006-137360, the contents of which are hereby incorporated by reference.

BACKGROUND OF THE INVENTION

1. Field of the Invention

The present invention relates to an electric junction box used in a vehicle.

2. Description of the Related Art

Generally, an electric junction box includes a substantially box-shaped case having a first box for receiving a plurality of electric components, a cover as a second box for being attached to the first box. According to Japanese Published Patent Application No. 2003-174711, this case includes locking structures mounted on the first box and the cover for being engaged with each other at second and fourth outer walls thereof. According to this case, a plurality of locking structures can be collectively engaged by pushing the cover against the first box. However, the locking structures cannot collectively be released. They should be released one by one. Therefore, there is a problem that workability of releasing the locking structures is not good.

Further, according to Japanese Published Patent Application No. 2002-330529, there is proposed a case in which a self hinge connects an outer wall of the first box with an outer wall of the cover, and locking structures for engaging the first box with the cover are mounted on other outer walls of the first box and the case. According to this case, because the number of the locking structures can be smaller than the case having the locking structures on the outer walls, the locking structures can be relatively easily released. However, there is a problem that a gap is generated between the first box and the cover owing to resiliency of the self hinge.

Accordingly, an object of the present invention is to provide a case in which the first box and the second box are easily detachably attachable to each other, and it is prevented from generating a gap between the first box and the second box.

SUMMARY OF THE INVENTION

In order to attain the object, according to the present invention, there is provided a case including:

a first box having a first outer wall;

a second box having a second outer wall, the second box being attached to the first box;

locking members mounted on the first and second outer walls for being engaged with each other;

a pair of temporarily locking members between which the locking members are interposed, and each having a first projection projecting from an outside wall of the first and second outer walls toward an inside wall of the first and second outer walls, and a second projection projecting from the inside wall of the first and second outer walls toward the outside wall of the first and second outer walls, said temporarily locking members temporarily locking each other in a manner that end walls of the first projection and the second projection disposed away from the mating boxes are overlapped each other when the locking members are engaged with each other.

Preferably, one of the first and second outer walls is provided with a clipping member which clips the other of the first and second outer walls between the clipping member and the one of the first and second outer walls.

These and other objects, features, and advantages of the present invention will become more apparent upon reading of the following detailed description along with the accompanied drawings.

DETAILED DESCRIPTION OF THE PREFERRED EMBODIMENTS

A case 1 according to an embodiment of the present invention will be explained with reference to FIGS. 1 to 4. The case 1 forms an electric junction box 10 shown in FIGS. 1 and 2. The electric junction box 10 is mounted on a vehicle, and includes a case 1 and a plurality of electric components (not shown) received in the case 1.

The case 1 is made of insulating synthetic resin, and formed by widely known injection molding. Further, the case 1 includes a box main body 2 and a cover 3 as a second box being detachably attachable to the box main body 2.

Figure 1:
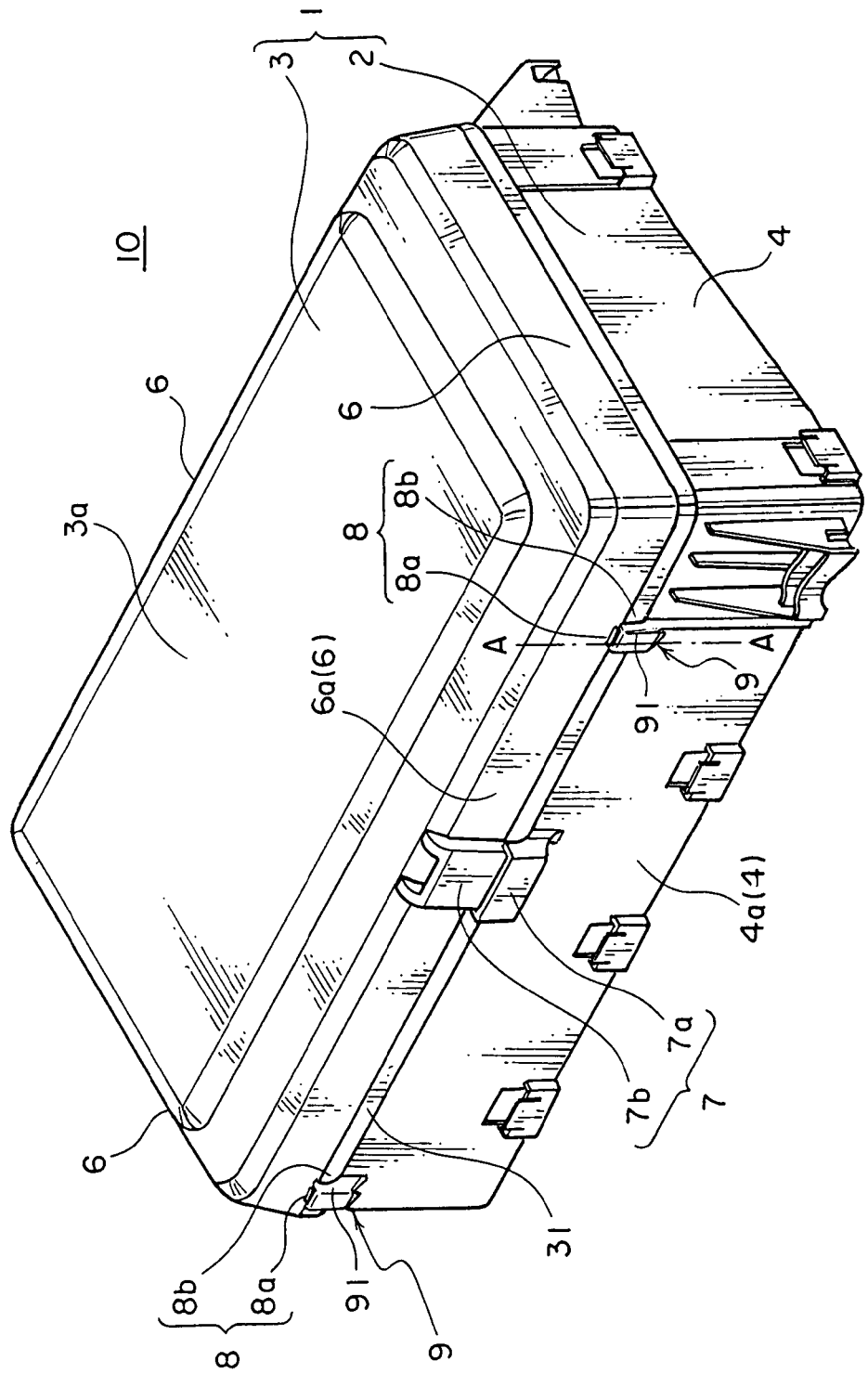
FIG. 1 is a perspective view showing an electric junction box having a case according to an embodiment of the present invention.
Figure 2:
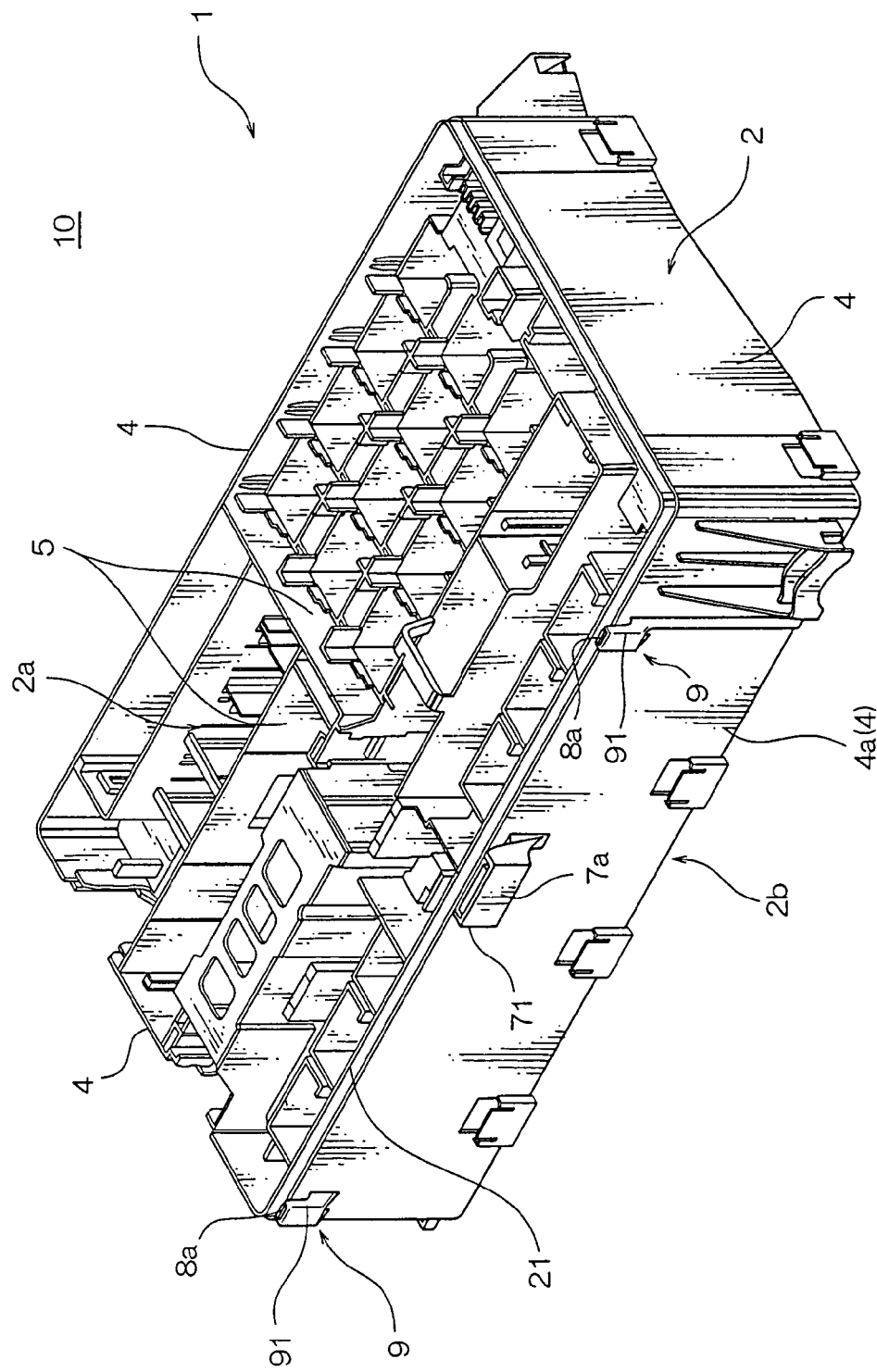
FIG. 2 is a perspective view showing a box main body of the case shown in FIG. 1.

As shown in FIG. 2, the box main body 2 is formed in a box shape by a plurality of outer walls 4. In an inside of the outer walls 4, a plurality of partition walls 5 form a plurality of spaces. Openings 2a, 2b are formed at both upper and lower ends of FIG. 2. Relays and fuses are attached to these spaces.

The cover 3 is attached to the box main body 2 in a manner to cover the opening 2a positioned at an upper part of FIG. 2 in the box main body 2. This cover 3 is formed in a box shape having an opening at one side by a ceiling wall 3a formed in a plate shape and facing the opening 2a, and a plurality of outer walls 6 extending vertically from the ceiling wall 3a.

The case 1 also includes a locking member 7 for keeping the box main body 2 and the cover 3 attached to each other, and a pair of temporarily locking members 8 between which the locking member 7 is interposed.

The locking member 7 is formed by a receiving member 7a and an insertion member 7b allowed to be engaged with each other. This receiving member 7a is formed on an outer wall 4a positioned at a front of FIG. 1 among the outer walls 4, and disposed at the center of an edge 21 at the opening 2a side. The outer wall 4a is wider than the neighboring outer walls 4. The insertion member 7b is formed on an outer wall 6a positioned at a front side of FIG. 1 among the outer walls 6, and disposed at the center of an edge 31 away from the ceiling wall 3a. The outer wall 6a is wider than the neighboring outer walls 6. Thus, according to the present invention, preferably, the locking members 7 are formed on the centers of the outer walls 4a, 4b each having a wider width.

The locking members 7 are engaged with each other by pressing a not-shown engaging claw mounted on the insertion member 7b into a concave groove 71 mounted on the receiving member 7a. For releasing the engagement, the receiving member 7a is bent by being pressed, and the insertion member 7b is lifted in a direction away from the box main body 2 so that the engaging claw is removed from the concave groove 71.

Figure 3:
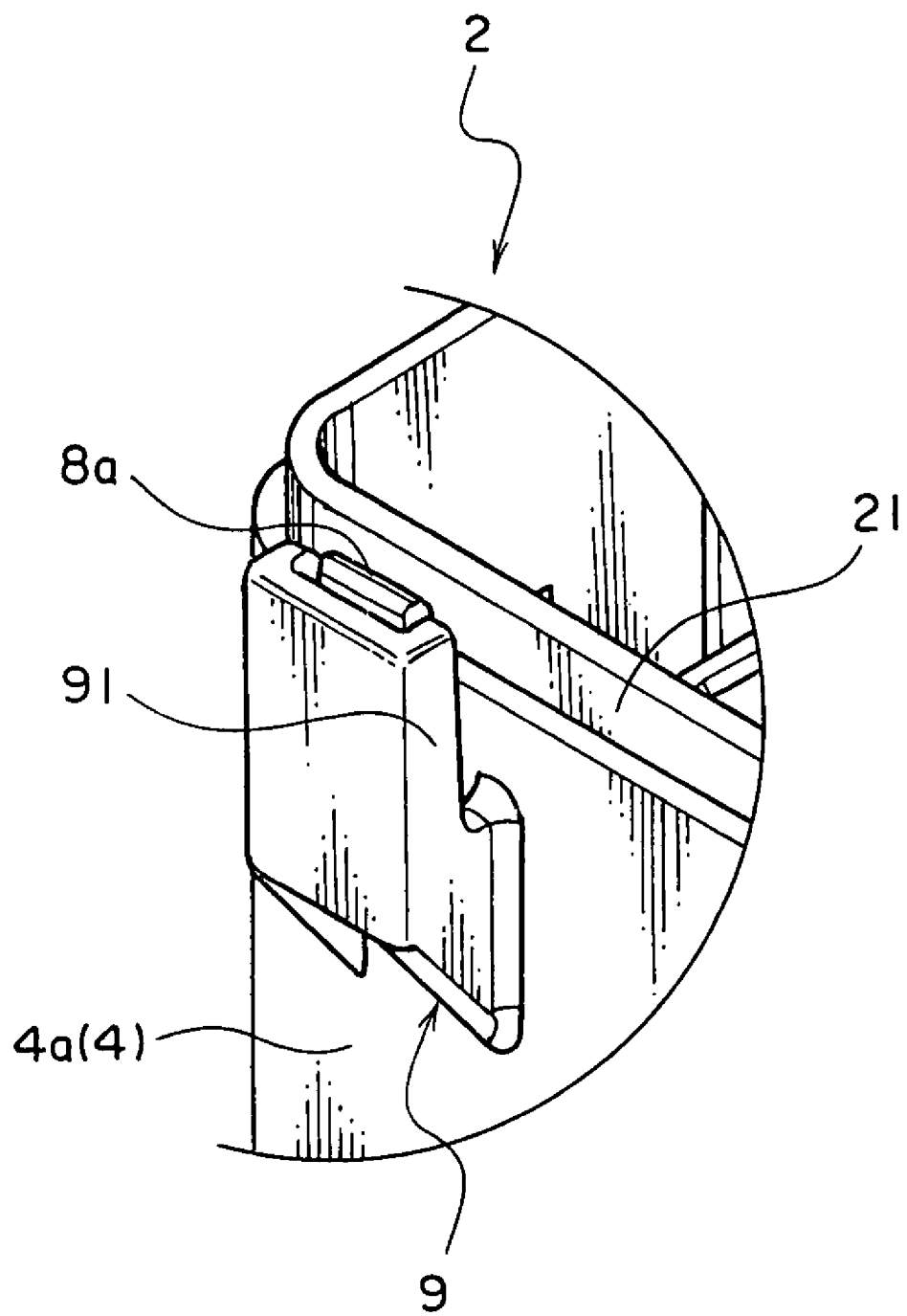
FIG. 3 is an enlarged perspective view showing a main part of the box main body shown in FIG. 2.
Figure 4:
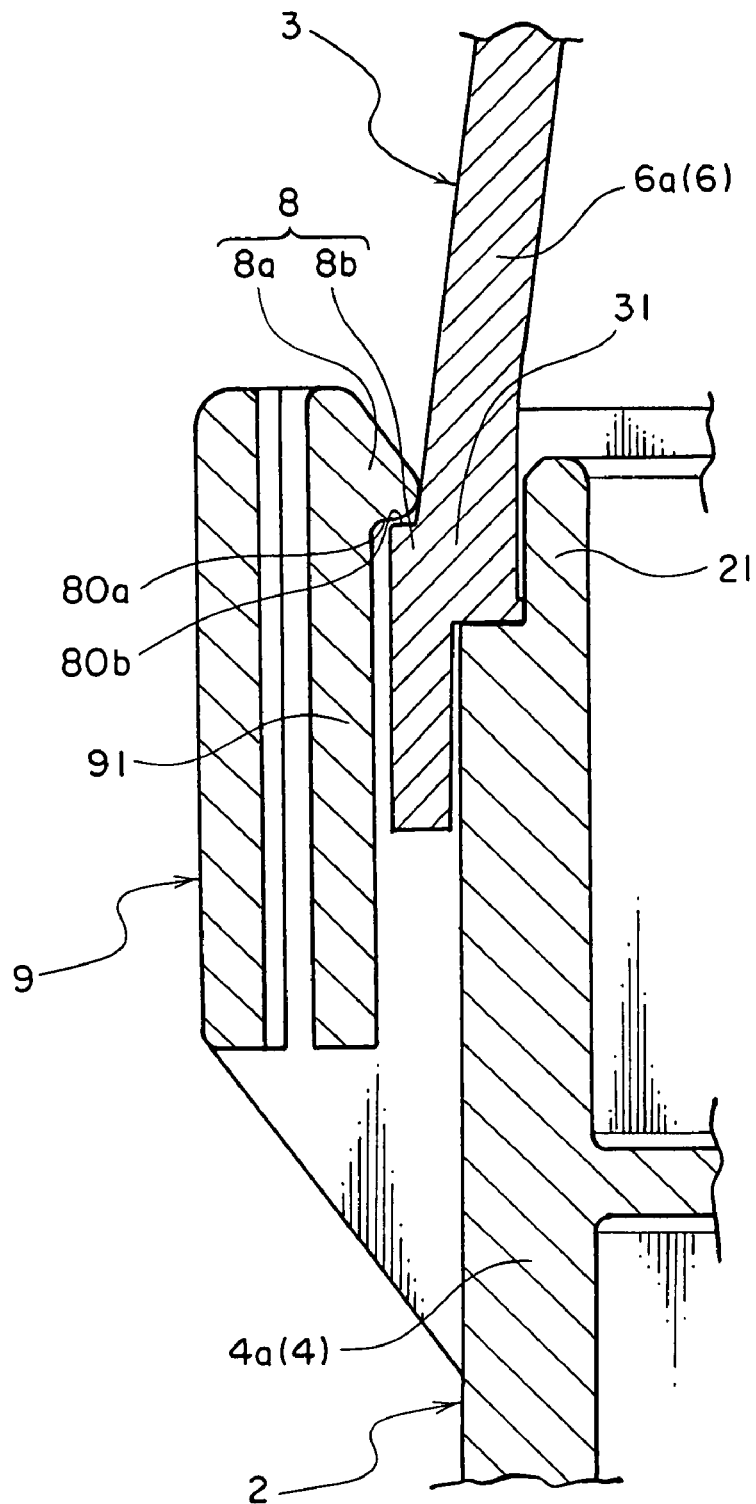
FIG. 4 is a sectional view taken on line A-A of FIG. 1.

Each temporarily locking member 8 includes a first projection 8*a* and a second projection 8*b* allowed to be temporarily engaged with each other. The first projections 8*a* are mounted on a pair of clipping members 9 extending vertically from both ends of the edge 21 of the outer wall 4*a*. As shown in FIGS. 3 and 4, each clipping member 9 includes a tabular facing member 91 facing the outer wall 4*a* with a gap. Each clipping member 9 positions the edge 31 of the outer wall 6*a* in between the facing member 91 and the outer wall 4*a*. Namely, the outer wall 6*a* is positioned inside the facing member 91. Thus, the outer wall 4*a* having the facing members 91 is a first outer wall in claims. The outer wall 6*a* positioned inside the facing members 91 is a second outer wall in claims. As shown in FIG. 4, the first projections 8*a* are projected from ends of the facing members 91 away from the opening 2*b* toward an inside of the box main body 2.

The second projection 8*b* is mounted on the outer wall 6*a*, and projected from both ends of the edge 31 toward an outside of the cover 3. Incidentally, in figures, the second projection 8*b* projected toward the outside of the cover 3 is formed around the whole edge 31 of the outer wall 6*a*. However, according to the present invention, the second projections 8*b* are at least mounted on positions respectively facing the first projections 8*a*.

The temporarily locking members 8 are temporarily locked together in a manner that the edge 31 of the outer wall 6*a* is positioned inside the facing member 91, and the second projection 8*b* is nearer the opening 2*b* than the first projections 8*a*. Under this condition, an end wall 80*a* of the first projections 8*a* at the opening 2*b* side, namely the end wall 80*a* away from the cover 3 is overlapped with an end wall 80*b* of the second projection 8*b* at the ceiling wall 3*a* side, namely, the end wall 80*b* away from the box main body 2. Further, the end wall 80*a* prevents the second projection 8*b* from moving away from the box main body 2. Namely, by temporarily locking the temporarily locking members 8, a rattle generated in a direction of attaching and detaching the box main body 2 and the cover 3 is absorbed. Further, clipping the edge 31 of the outer wall 6*a* between the first projections 8*a* and the facing member 91 prevents the box main body 2 and the cover 3 from rattling in a direction perpendicular to the direction of attaching and detaching the box main body 2 and the cover 3. Namely, a rattle generated in the direction perpendicular to the direction of attaching and detaching the box main body 2 and the cover 3 is absorbed by the first projections 8*a* and the facing member 91.

The temporarily locking members 8 are temporarily locked together simultaneously with an engagement of the locking member 7. Clipping the temporarily locking members 8 with the outer wall 4*a*, the clipping members 9, and the outer wall 6*a* unlocks the temporary lock of the temporarily locking members 8 accompanied with an action of disengaging the engagement of the locking member 7.

In the case 1, engaging the locking member 7 together keeps the box main body 2 and the cover 3 attached to each other. Temporarily locking the pair of temporarily locking members 8 each other prevents the box main body 2 and the cover 3 from rattling, namely, the box main body 2 and the cover 3 are attached to each other without any gap.

The electric junction box 10 formed by the case 1 is received in a not-shown waterproof case, and fixed to a panel forming a vehicle body. The electric junction box 10 is electrically connected to the various electric components mounted on the vehicle in a predetermined pattern.

According to this embodiment, engaging the receiving member 7*a* mounted on the outer wall 4*a* with the insertion member 7*b* mounted on the outer wall 6*a* keeps the box main body 2 and the cover 3 attached to each other. The temporarily locking members 8 temporarily locked together simultaneously with the engagement of the locking member 7 allows the box main body 2 and the cover 3 to be attached to each other without any gap. In the case 1, the box main body 2 and the cover 3 are easily attached and detached each other because they are attached to each other only with one locking member 7 and a pair of temporarily locking members 8. Because the temporarily locking members 8 are locked and unlocked simultaneously with the engagement and disengagement of the locking member 7, the box main body 2 and the cover 3 are easily attached and detached each other with a single action. By using the case 1 as a case of the electric junction box 10 attached to a narrow space, a burden of a maintenance worker for the electric components received in the case 1 is much reduced.

According to this embodiment, the locking member 7 includes the engaging claw and the groove 71. However, according to the present invention, a structure of the locking member 7 is not limited to this. Preferably, the clipping members 9 are provided, however, according to the present invention, the clipping members 9 may not be used. Further, the clipping members 9 may be mounted on the cover 3. A subject of the present invention is to reduce the number of the components of the locking member 7 by providing the temporarily locking members 8 near the locking member 7. Therefore, the locking member 7 is not limited to one. Depending on a status of use of the case 1, there may be provided a plurality of locking members 7.

According to the present invention, by clipping the outer wall 6*a* with the clipping members 9 and the outer wall 4*a*, rigidity of these outer walls 4*a*, 6*a* is increased. Therefore, an engaging margin between the first projections 8*a* and the second projection 8*b* can be reduced. Namely, because the outer walls near the temporarily locking members 8 are hard to be deformed, the temporally lock is not unlocked unintentionally. Because the engaging margin is reduced, the temporarily locking members 8 can be locked and unlocked with resilient deformations of the outer walls 4*a*, 6*a* accompanying with the engagement and disengagement of the locking member 7.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A case comprising:
   a box body formed into a box with a plurality of outer walls, including a first outer wall, and an opening formed in each of upper and lower ends of the box;
   a cover adapted to cover the opening in the upper end of the box having a ceiling wall and including a second outer wall extending vertically from the ceiling wall, the second outer wall forming an opening at a bottom end of the cover, the opening facing the upper end of the box, the cover being attached to and detachable from the box;
   locking members mounted on the first and second outer walls for being engaged with each other; and
   a pair of temporarily locking members between which the locking members are interposed, and each having a first projection projecting from an outside wall of the first and second outer walls toward an inside wall of the first and second outer walls, and a second projection projecting from the inside wall of the first and second outer walls toward the outside wall of the first and second outer walls, said temporarily locking members temporarily locking each other in a manner that end walls of the first projection and the second projection disposed away from the mating boxes overlap each other when the locking members are engaged with each other and arranged such that the temporary locking members are locked together simultaneously with the engagement of the locking members, such that the box and the cover are attached by a single action, wherein the cover is attached to and detachable from the box only with the locking members and pair of temporary locking members.

2. The case as claimed in claim 1, wherein one of the first and second outer walls is provided with a clipping member which clips the other of the first and second outer walls between the clipping member and the one of the first and second outer walls.

* * * * *